United States Patent [19]

Kaneko

[11] Patent Number: 4,763,856
[45] Date of Patent: Aug. 16, 1988

[54] FISHING REEL

[75] Inventor: Kyoichi Kaneko, Higashi-Kurume, Japan

[73] Assignee: Daiwa Seiko, Inc., Tokyo, Japan

[21] Appl. No.: 17,906

[22] Filed: Feb. 24, 1987

[30] Foreign Application Priority Data

Apr. 9, 1986 [JP] Japan .................................. 61-52958

[51] Int. Cl.$^4$ .................... A01K 89/02; A01K 89/015
[52] U.S. Cl. .................................................. 242/217
[58] Field of Search ........... 242/217, 218, 219, 84.1 R

[56] References Cited

U.S. PATENT DOCUMENTS

| 2,553,200 | 5/1951 | Mandolf et al. | 242/217 |
| 3,198,457 | 8/1965 | Holahan | 242/217 |
| 3,478,977 | 11/1969 | Sarah | 242/219 |
| 3,572,607 | 3/1971 | Wilson | 242/219 |

FOREIGN PATENT DOCUMENTS 85241  5/1984  Japan .

Primary Examiner—Donald Watkins
Attorney, Agent, or Firm—Kalish & Gilster

[57] ABSTRACT

A fishing reel having a main body frame which latter includes a pair of opposed support plates, with there being an outer plate provided spacedly from one of the support plates. A spool shaft extends between the support plates and carries a fishing line spool thereon. A handle shaft extends between the outer plate and one of the support plates and is adapted for rotative movement. A motion transmission system is provided for causing the spool shaft to rotate respondingly to the rotation of the handle shaft. The handle shaft contains a retaining portion and a locking member engageable with the retaining portion on the shaft is presented so as to prevent axial movement of the handle shaft and thereby conduce to its stability. The retaining portion may be a groove formed in the periphery of the shaft and the locking member having a portion for extension into the groove; or the retaining portion may be a collar with one surface directed toward the locking member for abutment therewith to prevent the undesired axial travel of the handle shaft.

5 Claims, 2 Drawing Sheets

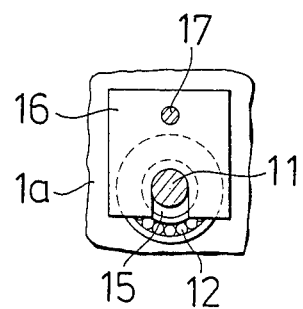
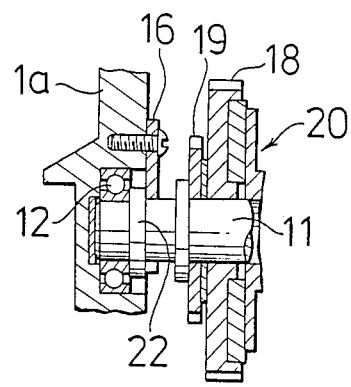

FISHING REEL

BACKGROUND AND SUMMARY OF THE INVENTION

The present invention relates to a fishing reel of a type employing bearings on opposed sides and, more particularly, to an improvement therefor in a structure for supporting a handle shaft for driving the line-carrying spool.

A handle shaft for driving the spool of a typical fishing reel is generally hollow, and is rotatably disposed upon a fixed shaft which is secured to a supporting plate of a main body frame of the reel so as to be held on one side thereof. This hollow shaft is prevented from coming off or being displaced by means of an E-washer engaged with the tip of the fixed shaft. A handle is secured upon an outwardly projecting end of the hollow handle shaft. Furthermore a drive gear for transmitting rotation to the spool, a drag mechanism for frictionally coupling this drive gear with the hollow handle shaft and a knob for adjusting a driving force thereof are normally incorporated in the hollow shaft.

However, since handle shaft-supporting mechanisms of this type supports the handle shaft on one side thereof, its supporting strength is insufficient, and misalignment is liable to occur causing lack of parallelism with the spool shaft. Consequently, there has been the problem of engaging the drive gear on the handle shaft side with a pinion on the spool shaft side. In addition, there are other drawbacks in that the number of parts employed is substantial with production costs being relatively high as a result.

Heretofore, there has been an effort to mount the handle shaft rotatably with respect to the supporting plate and outer plate of the main body frame so as to be engaged on both sides, as disclosed by Japanese Patent Laid-Open Publication No. 85241/1984. The arrangement of this type of reel is such that the axial movement of the handle shaft is restricted by there being a flange member interposed between a frictional plate and a pressing member of a drag mechanism mounted on the handle shaft for engagement with the inner surface of the outer plate.

With such a conventional manner of supporting the handle shaft, as described above, since the axial movement of the handle shaft is restricted by the flange member interposed between a frictional plate and a pressing member which constitute a drag mechanism to engage the inner surface of the outer plate, a gap is created between the flange member and the inner surface of the outer plate if a drag force-adjusting knob is operated to increase the drag force and is pressed in the direction in which the friction plate and the like are brought into pressure producing contact with the drive gear. This gap causes an increase in play which results from the axial movement of the handle shaft, and also causes a problem in the engagement of the drive gear with the pinion as well as in the engagement of a ratchet gear for preventing reverse rotation by a ratchet pawl. In particular, if the friction plate and the like becomes worn, the play in the handle shaft becomes markedly increased.

In addition, the handle shaft is simply mounted for rotation in a bore formed in the support plate without any associated means being provided for preventing the handle shaft from becoming dislodged or displaced. Consequently, the handle shaft as installed in the support plate is fundamentally in unstable condition and the installation of the drive gear, the drag mechanism, and the like onto the handle shaft is difficult with potential for undesired complications with the result that the working efficiency of the system is gravely impaired Accordingly, an object of the present invention is to provide a fishing reel which is so constructed as to eliminate axial movement of the handle shaft during operation for enhanced, reliable efficiency. Another object of the present invention is to maintain the handle shaft on the support plate during assembly thereby assuring of proper disposition of the associated components.

To this end, the present invention provides a fishing reel of a type employing bearings on opposite sides and having a main body frame with a spool rotatably supported between two support plates of said frame by means of a spool shaft, there being a handle shaft adapted to transmit rotation to the spool through a pinion and a drive gear. The opposite ends of the handle shaft are journalled in one of said support plates and in an outer plate fixed thereto; a retaining portion being formed about the outer periphery of a support plate adjacent end portion of the handle shaft, and a locking member engaging a retaining portion for restricting axial movement of the handle shaft.

BRIEF DESCRIPTION OF THE DRAWINGS

FIG. 2 is an enlarged, side elevational view, in partial section, of the locking member and related element for maintaining a handle shaft against displacement; and FIG. 3 is a side elevational view, in partial section, of another embodiment of the means for maintaining a fishing reel handle shaft against displacement, the same being constructed in accordance with and embodying the present invention.

DESCRIPTION OF PRACTICAL EMBODIMENTS

Figure 1:
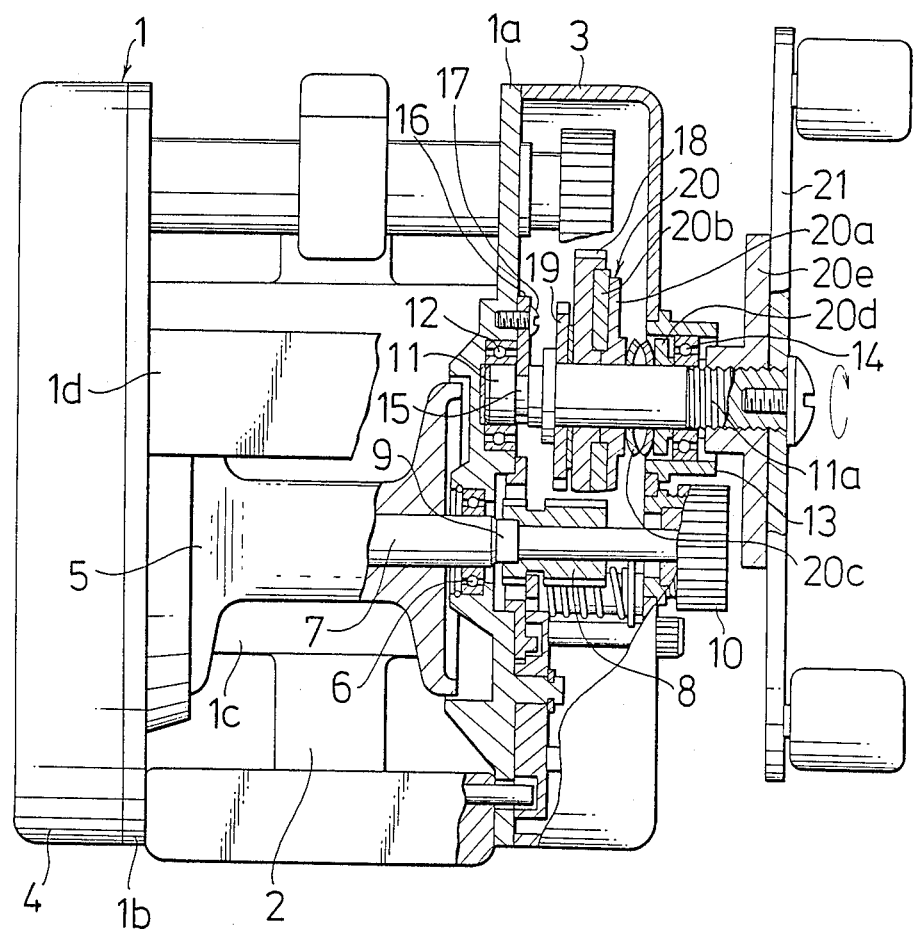
FIG. 1 is a top plan view, partially in section, of a fishing reel constucted in accordance with and embodying the present invention.

Referring now to the accompanying drawings:

FIGS. 1 and 2 illustrate a fishing reel A of the present invention wherein a main body frame 1 comprises support plates 1a, 1b at opposite ends thereof, which latter are integrally interconnected, in parallel relationship by means of a plurality of support columns 1d disposed transversely, bridgingly therebetween. A leg 2 for installing fishing reel A onto a fishing pole (not shown) is provided to a support column 1c on the lower surface of main body frame 1. A right-hand outer plate 3 is provided on support plate 1a so as to surround the external surface thereof, while a left-hand outer plate 4 is provided on support plate 1b so as to surround the external surface thereof. A spool 5 disposed inside main body frame 1 is secured concentrically to a spool shaft 7 which is rotatably mounted between support plates 1a, 1b by bearings 6. A pinion 8 is rotatably carried on a projecting portion of spool shaft 7 projecting into the interior of the spacing developed by right-hand side plate 3 and support plate 1a. Pinion 8 is engaged detachably with a clutch portion 9 formed on the projecting portion of spool shaft 7, said detachable engagement being effected by an operating member mounted transversely between the support plates in a well known manner. A brake mechanism 10 is disposed exteriorly of right-hand side plate 3 so as to apply mechanical braking action to spool 5.

A handle shaft 11 bridging support plate 1a and right-hand side plate 3 in parallel relation with spool shaft 7 is provided with one end thereof being rotatably supported by support plate 1a through bearings 12, with the other or opposite end thereof being rotatably supported inside a cylindrical member 13 provided on righthand side plate 3 by bearings 14. An annular groove 15 is formed around the outer periphery of one end portion of handle shaft 11, and a locking member 16 having a portion received within groove 15 is secured to support plate 1a as by a screw 17. Locking member 16 is of general plate form having a recess, provided in the lower portion, of such radius for fitted reception in said groove 15. This arrangement restricts the axial movement of handle shaft 11, and assures that said shaft 11 will be held in a stable manner with respect to support plate 1a even if the other end of shaft 11 is unsupported by bearings 14. In addition, a drive gear 18 for engaging pinion 8 is fixed to handle shaft 11 within right-hand outer plate 3 so as to be movable in the axial direction of shaft 11 and to be rotatable relative to the same. Furthermore, a ratchet gear 19 for preventing reverse rotation is provided adjacent to drive gear 18 for movement axially of shaft 11 and to be in fixed, nonrotatable relation to the same. Reference number 20 denotes a drag mechanism for generating rotational torque to spool 5 by frictionally coupling drive gear 18 and handle shaft 11. Drag mechanism 20 is constituted of the following: a pressing plate 20a provided on shaft 11 for movement axially thereof and being relatively nonrotatable with respect thereto, a friction plate 20b interposed between confronting side surfaces of pressing plate 20a and drive gear 18; a leaf spring 20c for adjusting the drag force; a spring seat 20d interposed between leaf spring 20c and bearings 14; and a drag force-adjusting knob 20e which is engaged to a threaded portion 11a at the proximate end of handle shaft 11 for securement to a handle 21 by conventional means.

In a fishing reel as above-described, if handle 21 is rotated in the direction of the arrow A in FIG. 1, handle shaft 11 will concurrently rotate in the same direction. At the same time, drive gear 18 which is frictionally coupled therewith through drag mechanism 20 also rotates in the same direction. This rotation is transmitted to spool 5 by means of pinion 8, clutch portion 9, and spool shaft 7 In conjunction with the rotation of spool 5, a fishing line (not shown) is wound upon spool 5.

In addition, if knob 20e is rotated, as in either a tightening or loosening direction, bearings 14 and bearing seat 20d will move axially of handle shaft 11 in conjunction with the particular operation of knob 20a, which in turn causes leaf spring 20c to be compressed or extended, as the case may be. Simultaneously, as spring pressure is applied to pressing plate 20a, the pressure of contact between drive gear 18 and friction plate 20b is commensurately varied, thereby adjusting the drag force. At that time, since handle shaft 11 is held by locking member 16 against displacement, said shaft 11 is prevented from moving in an axial direction.

In the embodiment described above, as for handle shaft 11, a system is adopted in which its axial movement is restricted by means of locking member 16 protruding into annular groove 15. As a result, handle shaft 11 does not move in an axial direction upon either tightening or loosening operation of drag mechanism 20. In addition, handle shaft 11 is not subjected to any effect from the wear of friction plate 20b and the like, and the condition of engagement of the drive gear with the pinion is always reliably maintained. Consequently, damage to tooth profiles as experienced in the past does not occur, so that the rotational performance is improved substantially, and without problems developing in the ratchet mechanism for preventing reverse rotation. Hence, the performance of the overall function of the reel is greatly improved Furthermore, since handle shaft 11 can be stably maintained in such a manner upon plate 1a by means of locking member 16, the installation of drive gear 18, ratchet gear 19, and drag mechanism 20 on handle shaft 11 is facilitated; with the work efficiency being also improved as a result.

FIG. 3 fragmentally illustrates another embodiment of a reel constructed in accordance with the present invention, adapted to prevent accidental displacement of the handle. In this embodiment a collar portion 22 is provided on the outer periphery of the normally inner end of handle shaft 11, and locking member 16 is engageable therewith.

With this embodiment as well, it is possible to obtain effect similar to those of the embodiment shown in FIG. 1.

It should be understood that the retaining portion for engaging locking member 16 to restrict axial movement of handle shaft 11 is not restricted to groove 15, or to collar portion 22 as in the above-described embodiments.

In the above-described embodiments, support plate 1a has been described as being integral with main body frame 1. However, support plate 1a may be constructed separately from main body frame 1, and handle shaft 11 may be disposed for support by plate 1a so as to be prevented from undesired displacement.

As described above, in accordance with the present invention, the retaining portion is provided at one end of the handle shaft with the opposite end thereof being rotatably supported, and the locking member engaging with said retaining portion being fixed to the support plate so as to hold the handle shaft in such a manner as to prevent the same from coming off. Consequently, the amount of play of the handle shaft in the axial direction thereof is always maintained to a high degree of accuracy to eliminate unnecessary movement. Therefore, the winding operation of the handle is stable and smooth.

Also, since constant stable engagement of the drive gear with the pinion is maintained, the engagement accuracy becomes fixed, the durability improves, and the rotational performance also improves substantially. Furthermore, the handle shaft can be held by the support plate in such a manner as to be prevented from coming off, the holding of the handle shaft by the support plate can be stablized, and the installation of the drive gear, the drag mechanism, and the like onto the handle shaft can be facilitated. Thus, the present invention has outstanding features and practicality.

What is claimed is:

1. A fishing reel comprising a main body frame, a pair of opposed support plates provided on said frame, an outer plate provided spacedly from an adjacent one of said support plates, a spool shaft extending between said support plates, a fishing-line spool carried on said spool shaft, a handle shaft extending between said outer plate and said adjacent support plate, bearing means carried by said adjacent support plate and outer plate for journalling respective inner and outer ends of the handle shaft, motion transmission means for causing rotation of said spool shaft responsive to rotation of said handle shaft, a drag mechanism including a drag-force adjusting element rotatably engaging a portion of the handle shaft for either tightening or loosening movement, said inner end of the handle shaft having a retaining portion, and a locking member engageable with said handle shaft retaining portion for preventing said handle shaft from axial movement upon either tightening or loosening movement of said drag-force mechanism adjusting element.

2. The invention defined in claim 1 wherein the retaining portion is an annular groove formed in the periphery of said handle shaft inner end, the locking member being carried by said adjacent support plate.

3. The invention defined in claimed 2 wherein the groove is located proximate to said adjacent support plate, said locking member containing a portion of radius complementary to said groove for fitted reception therein for causing said handle shaft to be held stably in journalled relation within said adjacent support plate even if the outer end of said handle shaft is not journalled in the bearing means of said outer plate.

4. The invention defined in claim 1 wherein the retaining portion is a collar mounted encirclingly on the inner end of said handle shaft and being of such radius as to project beyond the periphery thereof, the locking member being carried by said adjacent support plate.

5. The invention defined in claim 4 wherein the locking member is a plate having a free end portion projecting toward the periphery of said shaft in confronting relation to one side of said collar for abutment thereby to inhibit axial movement of said shaft and for causing said handle shaft to be held stably in journalled relation within said adjacent support plate even if the outer end of said handle shaft is not journalled in the bearing means of said outer plate.

* * * * *